March 1, 1938.　　　M. F. RATHER　　　2,109,649
CONTROL FOR AIR CONDITIONING SYSTEMS
Filed July 17, 1936　　　2 Sheets-Sheet 1
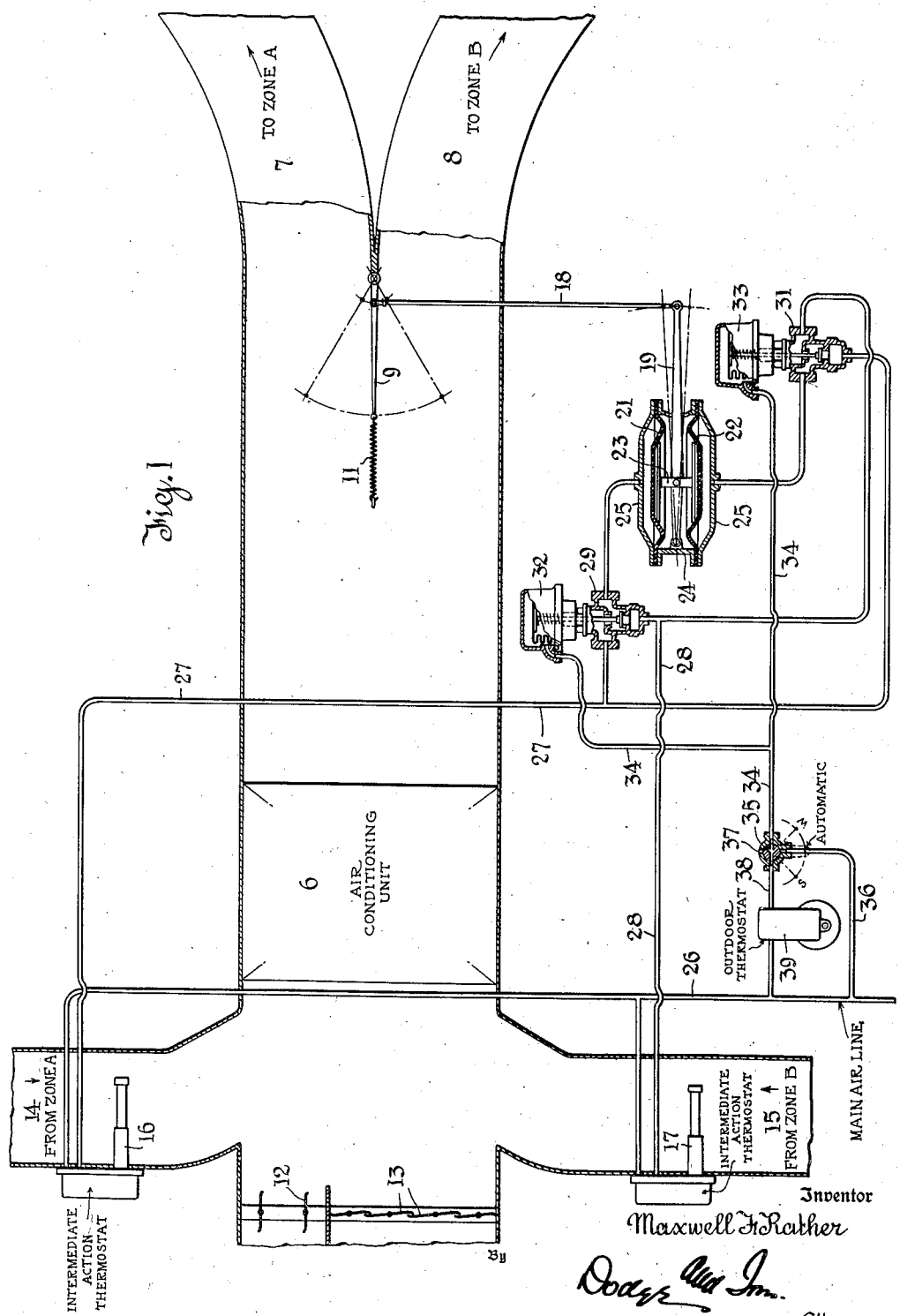
Inventor
Maxwell F. Rather
Attorneys

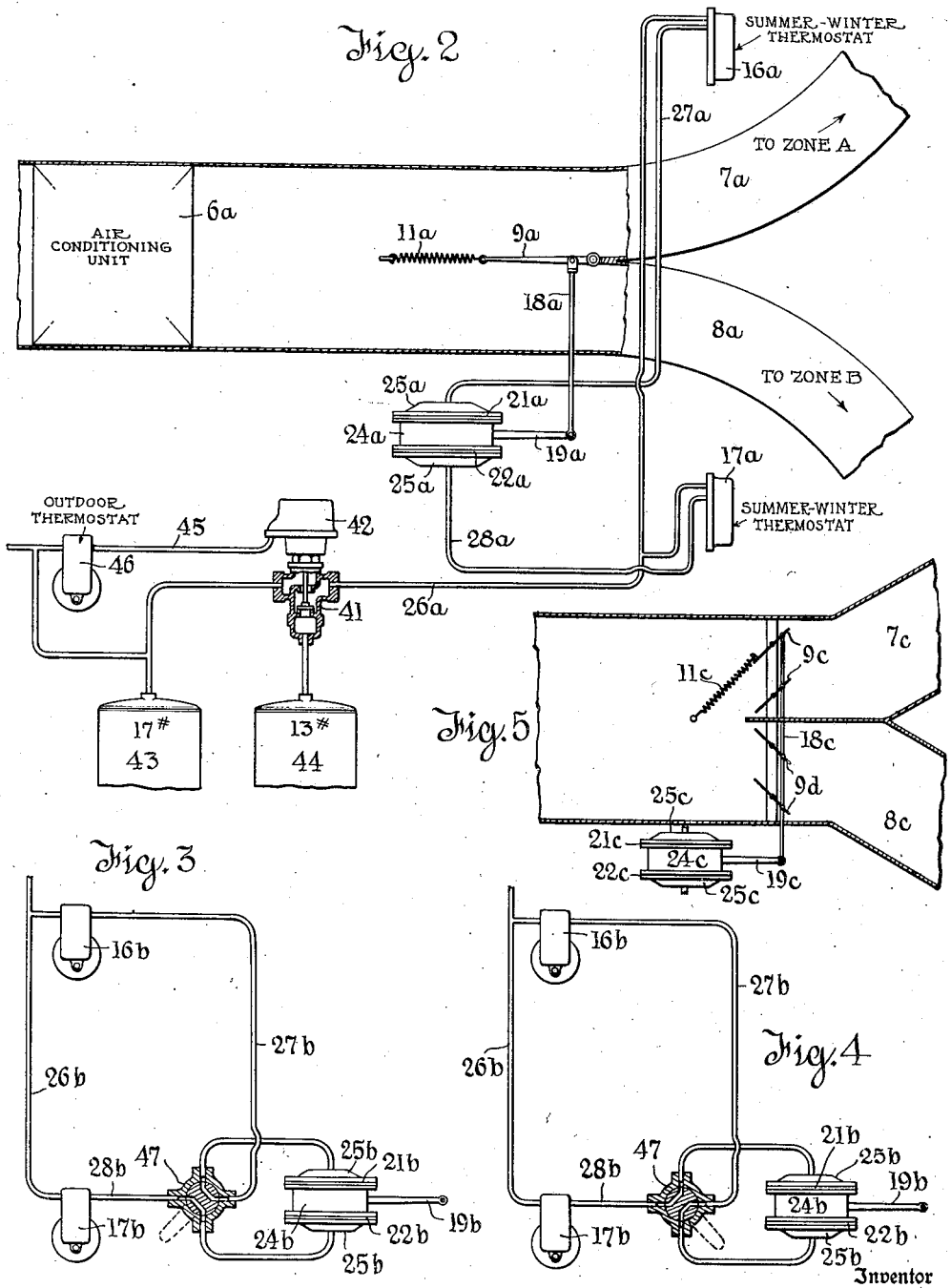

Patented Mar. 1, 1938

2,109,649

UNITED STATES PATENT OFFICE 2,109,649

CONTROL FOR AIR CONDITIONING SYSTEMS

Maxwell F. Rather, Cleveland, Ohio, assignor to Johnson Service Company, Milwaukee, Wis., a corporation of Wisconsin Application July 17, 1936, Serial No. 91,247

9 Claims. (Cl. 236—1)

This invention relates to air conditioning and particularly to systems where a single conditioner supplies conditioned air to two zones.

In installations of this type the demands made for conditioned air by the two zones vary relatively to one another from time to time so that in order to apply the output of the conditioner to best effect it is necessary to divide the output directed to the two zones in varying proportions.

One object of the present invention is to divide the output under the control of the differential in condition in the two zones. Temperature will be assumed as the controlling condition for purpose of explanation.

Modern year round conditioning systems operate reversely under winter and summer conditions. Generally stated they heat and humidify in winter and cool and dehumidify in summer. Where control is by regulating the flow of conditioned air to the two zones the control must be reversed for the two seasons. For example, if temperature differential be adopted as the controlling factor a fall of temperature would be corrected by an increase in the flow of conditioned air, whereas in summer a fall would be corrected by a decrease. This implies a reversal of the proportioning action. To meet this requirement the present invention provides for a reversal of the differential effect as between winter and summer conditions.

As a refinement, means responsive to outdoor conditions (usually temperature) are provided to effect the reversal as such temperature passes above and below a chosen value.

It should be observed that this invention is not concerned with control of the total performance of the conditioner, but rather with proportioning the total output between zones or points of use. Hence to simplify the description it will be assumed that the conditioner has a constant output, though that condition is not essential. In other words the invention does not inhibit the use of means to regulate the total performance of the conditioner, but is not directly concerned with such means.

Practical embodiments of the invention will now be described with reference to the accompanying drawings, in which,—

Fig. 1 is a diagrammatic plan view, largely in section, showing the control applied to a single year-round conditioner serving two zones.

Fig. 2 is a similar view showing an equivalent system using a different type of thermostat.

Figs. 3 and 4 show the system of Fig. 1 modified by the substitution of a single multiple way cock for the two simultaneously operated three-way poppet valves used in the structure of Fig. 1.

Fig. 5 shows an alternative damper structure which can be used with the structures of Figs. 1 and 2.

Referring first to Fig. 1, 6 represents conditioning means for heating (and if desired humidifying) air passing through it in winter, and for cooling and dehumidifying air passing through it in summer. Its construction and mode of operation are immaterial so long as it has these alternative functions. A circulating fan is normally included in such a conditioner but is not illustrated as a distinct element.

A branch 7 delivers conditioned air to one zone A and a branch 8 delivers conditioned air to the other zone B. A splitter damper 9 urged to its neutral or mid-position by spring 11 may be shifted to vary the relative proportions sent to zone A and zone B of the total conditioned air available.

Manually adjustable louver dampers 12 control the amount of fresh air drawn into the conditioner. Other manually operable dampers 13 are closed when the conditioner is operating, but may be open when the system operates merely to ventilate and the conditioner is out of action.

A return duct 14 leads back to conditioner 6 from zone A and a return duct 15 from zone B. Mounted in these ducts are intermediate acting (sometimes called progressively acting) pneumatic thermostats 16 and 17. These thermostats sense the temperature in the respective zones, and location on the return ducts is well recognized in the art as the approximate equivalent of location in the zone itself.

The damper 9 is actuated through link 18 and lever 19 by two opposed diaphragm motors whose diaphragms appear at 21 and 22. The diaphragms operate through a thrust member 23 pivoted to lever 19. They are sustained by housing 24 to which lever 19 is pivoted and their working spaces are enclosed by caps 25.

The thermostats 16 and 17 receive air through supply line 26 and in response to similar variations of temperature establish similarly varying pressures in their branch lines 27 and 28. Each branch line 27 and 28 is connected to two three-way valves 29 and 31 of the double-beat poppet type. Valve 29 is shiftable to connect lines 27 and 28 selectively with the working space of diaphragm 21 while valve 31 is shiftable to connect them selectively with the working space of diaphragm 22.

The valves 29 and 31 are operated in unison by motors 32 and 33 connected to line 34. The connections to valves 29 and 31 are such that when line 27 is connected to the working space of diaphragm 21 line 28 is connected to the working space of diaphragm 22, and vice versa.

A manually operable multiple way valve 35 connects line 34 selectively to supply line 26, via branch 36 (summer setting) or to atmosphere via port 37 (winter setting) or to the branch line 38 of a positive acting outdoor thermostat 39 which receives its air supply from supply line 26. This last is the automatic setting and when outdoor temperature is above a chosen value, say 70° thermostat 39 puts line 34 under pressure to establish summer conditions, while when outdoor temperature is below 70° it vents line 34 to establish winter conditions.

The operation of the system above outlined is as follows:

If the system is operating under winter conditions, at which time the conditioning unit would be furnishing heated air, the damper 9 will operate to divert more air to whichever of the zones is at the lower temperature and send equal quantities of air to the two zones if they are at the same temperature.

On the other hand, if the system is operating under summer conditions the operation of the damper will be exactly the reverse of that just described, that is it would send more air to whichever of the two zones is at the higher temperature. It will be observed that the two thermostats 16 and 17 operate as a differential thermostatic controller responsive to the temperature difference between the two zones.

Various other differential thermostatic arrangements might be evolved, and they fall within the broad scope of the invention.

Turning now to Fig. 2, the parts identified by the reference numerals 6 to 15 inclusive are the same as before, and so far as they are visible in the drawings, are given similar reference numerals with the letter a. Instead of the thermostats 16 and 17 use is made of two convertible summer-winter thermostats, the thermostat 16a being mounted in the zone A and the thermostat 17a in zone B. They might equally well be mounted in the return ducts in a manner similar to that shown in Fig. 1.

The thermostats 16a and 17a are of the type described and claimed in the patent to Otto, No. 2,021,263, November 19, 1935, and illustrated in detail in Fig. 1 of that patent. Generally stated, they include two reversely acting thermostatic elements, one to control heating and the other to control cooling by regulating the leak port which exercises its control through the progressive relay. Selection between the two thermostatic units in each thermostat is made by changing the pressure of the air supplied to the thermostat.

Since the thermostats themselves effect the necessary reversal by selection between the two thermostatic units, it is unnecessary to reverse their connections to the diaphragm motor. Consequently the branch line 27a of thermostat 16a is connected to the working space of diaphragm 21a and the branch line 28a of the thermostat 17a is connected to the working space of the diaphragm 22a. The diaphragm motor comprising the parts 18a to 25a is identical with the diaphragm motor having similarly numbered parts in Fig. 1.

To perform the selection a three-way valve 41 is operated by a motor 42 to connect selectively with the supply line 26a leading to the two thermostats, either of two pressure sources, a source 43 at say 17 pounds gage, or a source 44 at say 13 pounds gage. The change in the supply pressure, as will be understood, performs the selection between the winter thermostatic element and the summer thermostatic element, of the thermostats 16a and 17a, shifting them so that both are set for summer conditions or both are set for winter conditions, as the case may be.

The motor 42 is connected to the branch line 45 of an outdoor positive acting thermostat 46 which receives its pressure supply from the source 43. As the outdoor temperature passes a chosen value, say 70°, the thermostat 46 either places the motor 42 under pressure or vents the pressure from the motor, shifting the valve 41 to change the supply of pressure to the summer-winter thermostats. The action of this device is the same as that already described.

The shift from summer to winter conditions is made by substituting reversely arranged thermostatic elements rather than by reversing the connections of the thermostats to the differential motor, but the differential action is present, as before, and the effect of reversal is exactly the same.

Figs. 3 and 4 show winter and summer conditions for a modified form of the system shown in Fig. 1. Here a single four-way valve 47 is substituted for the two three-way valves 29 and 31 of Fig. 1. Since the three-way valves 29 and 31 were operated in unison, a single four-way valve can be made to perform the same function.

In Figs. 3 and 4 the thermostat 16b corresponds to the thermostat 16 of Fig. 1, and the thermostat 17b corresponds to the thermostat 17 of Fig. 1. The differential diaphragm motor, indicated generally by the numeral 24b applied to the housing, is identical with the motor 24 shown in Fig. 1. The four-way valve 47 may be shifted either manually or by a motor controlled by an outdoor thermostat, not shown. In these figures the parts similar to those shown in Figure 1 are given similar reference numerals with the letter b throughout.

Fig. 5 illustrates merely the substitution of progressively acting louver dampers for the splitter damper. The louver dampers 9c, which control flow to zone A, open as the louver dampers 9d, which control flow to zone B, close. This reverse action is produced by a connecting link 18c. The differential is developed by a differential motor 24c, as in the other figures. A spring 11c urges the various louver dampers to their normal or equal flow conditions.

While a number of different embodiments have been illustrated to make clear the fact that the invention is capable of various mechanical expressions, other arrangements too numerous to mention, are possible within the broad scope of the invention. This contemplates, first, proportioning the flow to two zones in response to a differential of condition between those zones, and, second, such a reversal of the differential control that it may effect regulation in two senses, each one of which is inverse with reference to the other.

While control by temperature differential is convenient, and is expected to be the commercially most usual form, the principles of the invention are applicable to control by other atmospheric conditions variable by the conditioner, such as relative humidity.

What is claimed is,—

1. The combination of means for supplying conditioned air to two zones; means for varying the relative proportions of the total supply of conditioned air delivered to the respective zones; means responsive to the differential between similar atmospheric conditions in said two zones for controlling said varying means; and means for reversing the effect of said differential on said varying means, whereby the proportioning action is reversed with respect to such atmospheric condition.

2. The combination of means for supplying conditioned air to two zones; means for varying the relative proportions of the total supply of conditioned air delivered to the respective zones; means responsive to the differential between similar atmospheric conditions in said two zones for controlling said varying means; means for reversing the effect of said differential on said varying means; and means responsive to outdoor temperature and effective as such temperature passes above and below a chosen value to actuate reversely said reversing means.

3. The combination of means for supplying conditioned air to two zones; means for varying the relative proportions of the total conditioned air delivered to the respective zones; pneumatic thermostats, one subject to the temperature in each zone and each including a source of pressure fluid and thermostatic valve means serving to develop a pneumatic pressure which varies in relation to the temperature to which the thermostatic valve means responds; motor means arranged to actuate said varying means and responsive to the differential of said pressures; and means for reversing the effect of said differential on said motor, whereby the proportioning action is reversed with respect to temperature.

4. The combination of means for supplying conditioned air to two zones; means for varying the relative proportions of the total conditioned air delivered to the respective zones; pneumatic thermostats, one subject to the temperature in each zone and each serving to develop a pneumatic pressure which varies in relation to the temperature to which it responds; motor means arranged to actuate said varying means and responsive to the differential of said pressures; means for reversing the effect of said differential on said motor; and means responsive to outdoor temperature and effective as such temperature passes above and below a chosen value to actuate reversely said reversing means.

5. The combination of means for supplying conditioned air to two zones; means for varying the relative proportions of the total conditioned air delivered to the respective zones; two thermostats, one subject to the temperature in each zone and each including two relatively reversely acting thermostatic elements and selector means to render such elements active selectively; and actuating means for said varying means responsive to the differential between the indications of the thermostats in the two zones.

6. The combination of means for supplying conditioned air to two zones; means for varying the relative proportions of the total conditioned air delivered to the respective zones; two thermostats, one subject to the temperature in each zone and each including two relatively reversely acting thermostatic elements and selector means to render such elements active selectively; actuating means for said varying means responsive to the differential between the indications of the thermostats in the two zones; and a common actuating means for the selector means of the thermostats in the two zones.

7. The combination of means for supplying conditioned air to two zones; means for varying the relative proportions of the total conditioned air delivered to the respective zones; two thermostats, one subject to the temperature in each zone and each including two relatively reversely acting thermostatic elements and selector means to render such elements active selectively; actuating means for said varying means responsive to the differential between the indications of the thermostats in the two zones; a common actuating means for the selector means of the thermostats in the two zones; and means responsive to outdoor temperature and effective as such temperature passes above and below a chosen value to actuate reversely said common actuating means.

8. The combination of means for supplying conditioned air to two zones; means for varying the relative proportions of the total conditioned air delivered to the respective zones; two pneumatic leak port thermostats one subject to the temperature in each zone, and each including two relatively reversely acting leak controlling thermostatic elements, a supply connection, a branch connection in which control of the leak establishes variable pressure, and means responsive to the pressure in said supply connection for rendering said elements operative selectively; actuating means for said varying means responsive to the differential of pressures in the branch connections of the two thermostats; and means for changing the supply pressure.

9. The combination of means for supplying conditioned air to two zones; means for varying the relative proportions of the total conditioned air delivered to the respective zones; two pneumatic leak port thermostats, one subject to the temperature in each zone, and each including two relatively reversely acting leak controlling thermostatic elements; a supply connection; a branch connection in which control of the leak establishes variable pressure, and means responsive to the pressure in said supply connection for rendering said elements operative selectively; actuating means for said varying means responsive to the differential of pressures in the branch connections of the two thermostats; means for changing the supply pressure; and means responsive to outdoor temperature and effective as such temperature passes above and below a chosen value to actuate said supply pressure changing means.

MAXWELL F. RATHER.